United States Patent [19]
Clark et al.

[11] Patent Number: 5,927,464
[45] Date of Patent: Jul. 27, 1999

[54] CONVEYING APPARATUS

[75] Inventors: Paul Richard Clark; Robert Edward Clark, both of Hemel Hempstead, United Kingdom

[73] Assignee: Delta Regis Limited, Hertfordshire, United Kingdom

[21] Appl. No.: 08/746,451

[22] Filed: Nov. 8, 1996

[30] Foreign Application Priority Data

Nov. 11, 1995 [GB] United Kingdom .................... 9523130

[51] Int. Cl.$^6$ .................................................. B65G 37/00
[52] U.S. Cl. ........................................ 198/349; 198/465.1
[58] Field of Search ................................ 198/349, 349.5, 198/349.6, 349.8, 350, 465.1, 465.2, 465.3, 867.01

[56] References Cited

U.S. PATENT DOCUMENTS

| | | | |
|---|---|---|---|
| 5,271,490 | 12/1993 | Sticht | 198/349 |
| 5,289,983 | 3/1994 | Veda et al. | 198/349 X |
| 5,533,606 | 7/1996 | Yuyama | 198/349 |
| 5,593,072 | 1/1997 | Hester et al. | 198/350 X |
| 5,676,514 | 10/1997 | Higman et al. | 198/349 X |

FOREIGN PATENT DOCUMENTS

| | | |
|---|---|---|
| 0294731 | 12/1988 | European Pat. Off. . |
| 2519249 | 11/1976 | Germany . |

*Primary Examiner*—James R. Bidwell
*Attorney, Agent, or Firm*—Christie, Parker & Hale, LLP

[57] ABSTRACT

A conveying apparatus, particular for use in conveying large products such as engines around a production line, comprises a pallet which is driven with respect to a pair of guide rails. Power supply rails are provided on guide rails and power is drawn from these as the pallet moves to continuously power the pallet without requiring any on board power supply. Coding means are provided at particular spaced locations with respect to the rails and means are provided on the underside of the pallet to detect the code and so signals to a control unit which identifies the location of the pallet or acts upon the code to move the pallet in a particular predetermined manner. An electronic tag is uniquely associated with a product to be carried by the pallet and data from this is downloaded to the pallet where it can be subsequently downloaded to a work station as the pallet passed the work station to instruct the work station as to the operation to be performed on the product. Bi-directional communication may be achieved.

20 Claims, 3 Drawing Sheets

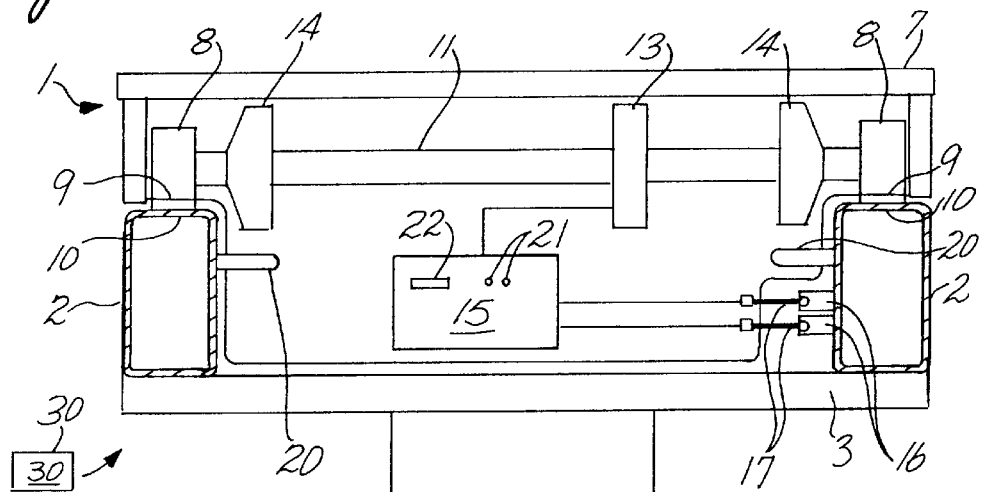
Fig. 2
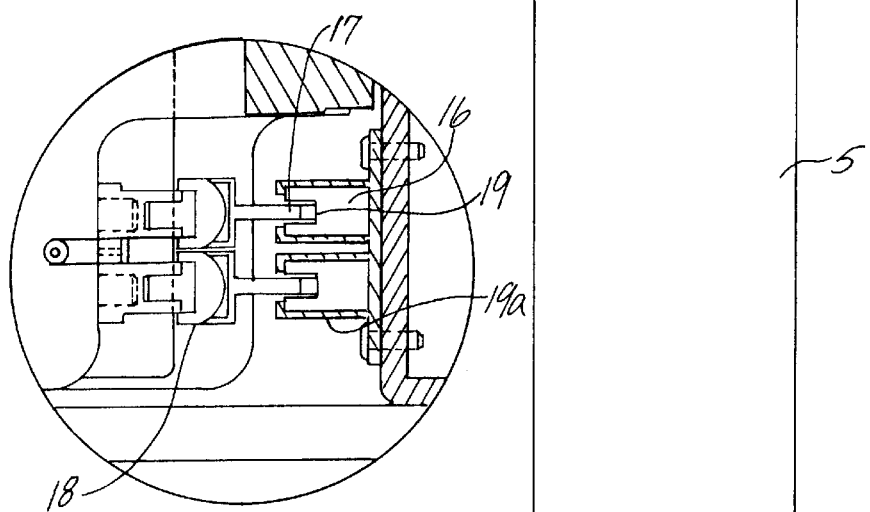
Fig. 3
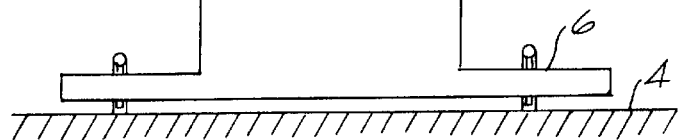

CONVEYING APPARATUS

FIELD OF THE INVENTION

This invention relates to conveying apparatus. In particular, it relates to conveying apparatus for moving pieces of equipment over fixed paths or tracks so that the apparatus traverses a fixed path in a production line for example where it passes a number of work stations. The products to be conveyed may be motor engines for example mounted on pallets, which pallets are conveyed around a production line for the engine to be worked on.

BACKGROUND OF THE INVENTION

Conventional means of transporting pallets use a moving, motorised, conveyor. For example this may comprise a pair of side rails joined by a plurality of parallel rotating cylinders which impart drive to a pallet lying upon them. The cylinders are provided with slipping clutches so that when a particular pallet reaches a desired work station, the pallet can be held stationary at that work station, holding the cylinders still by virtue of the clutching slipping. Such a system is wasteful in terms of power requirements and is inflexible; it is difficult to alter the configuration of the conveyor once assembled in situ. Also, automation of the pallet movement is difficult.

BRIEF SUMMARY OF THE INVENTION

According to the present invention there is provided a conveying assembly comprising a pallet adapted for movement relative to at least one guide rail, the pallet comprising means for driving the pallet with respect to the guide rail, wherein the pallet is provided with data processing and/or storage means for receiving data associated with a product carried by the pallet, and/or for receiving external control information to control the movement and/or functioning of the pallet.

Thus, in embodiments of the present invention the guide rail (or, more usually, a pair of guide rails) are stationary and the pallet moves by virtue of a drive means such as one or more motors driving wheels which act against the surface of the rail to drive the pallet. A product such a motor engine may then be placed upon the pallet.

BRIEF DESCRIPTION OF THE DRAWINGS

Embodiments of the invention will now be described, by way of example only, with reference to the accompanying drawings, in which:

FIG. 2 shows schematically a drive mechanism;

FIG. 3 shows the parallel structure of FIG. 2 in more detail;

DESCRIPTION OF EMBODIMENTS OF THE INVENTION

Figure 1:
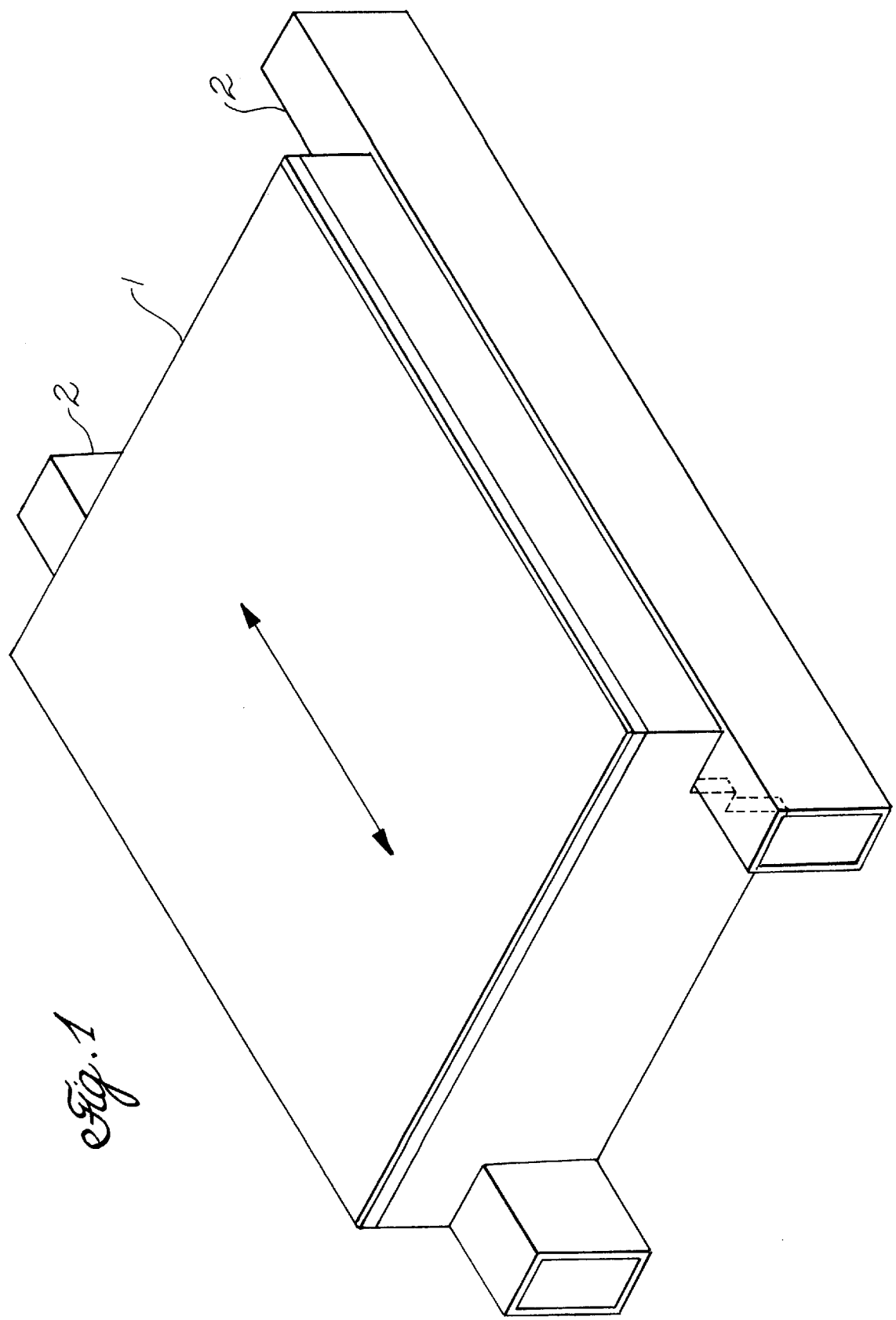
FIG. 1 shows a pallet which is moveable with respect to stationary guide rails.

A conventional conveying system for conveying pallets utilises a moving conveyor, for example a continuously moving belt or a plurality of individually rotating rollers upon which a substantially passive pallet is moved. Referring to FIG. 1, a conveying system according to the present invention comprises an active, ie driven pallet 1 moveable with respect to substantially stationary support rails 2. This is more efficient in terms of energy and far more flexible in that each of the pallets on the system (and there may be several tens or hundreds of them running on the same pair of static rails) are substantially independent of each other, and can be moved, stopped or started independently. Although two support rails are shown in the figure, the pallets may instead be mounted on a single rail or on three or more rails. Generally, a number of pallets will be used, independently, on a set of rails.

Referring to FIG. 2, the rails 2 may typically be mounted upon a plinth 3 spaced at a predetermined working height above a floor 4 by a stand 5. The plinth may have an enlarged base portion 6 which is securely bolted or otherwise affixed to the floor so as to allow substantially no relative movement between the two. The pallet 1 comprises a rigid top 7 upon which may be mounted an article to be worked on, such as a motor engine. The top may be independently rotatable with respect to the rest of the pallet. A cam drive mechanism may be used to achieve this rotation. The pallet is driven with respect to the rails by a pair of drive wheels 8 which are each mounted in a peripheral shoulder portion 9 of the pallet and contact the top portion 10 of the support rails 2. The support rails 2 are box-sectioned extrusions of any desired length and may have curved parts, or be formed of several preformed rails joined end to end. The rails extend in a desired configuration about a work space such as a factory floor, and may easily be altered to different configurations.

The two drive wheels 8 are provided on an axle 11 which may be provided towards the front of the pallet and two further idler wheels 12, which are not driven, may be provided towards the rear of the pallet. Driven wheels 8 are driven by a motor 13 through a respective pair of clutches 14. Alternatively, the clutches may be omitted and the on-board intelligence of the pallet used to stop and start the motor directly when desired. Gear arrangements may also be used if desirable. The motor is controlled from a power and control unit 15, which includes a microprocessor and acts as a data processing and/or storage means. The power supply may of course be separate from the control unit but they are shown as one for convenience. Unit 5 may have its own memory.

When it is required to stop a pallet at a desired position, the motor may be stopped. Alternatively, when clutches are used they may be disengaged so that the wheels are not driven whilst the pallet has to remain stationary. The clutches may then be re-engaged to drive the pallet again.

It is preferable that the pallet is able to move forward as well as backward.

Clearly, it would be inconvenient for each pallet to have to have its own power supply onboard since it will require large amounts of power to move a pallet over any distance with a relatively heavy item such as an engine upon it. Thus, in preferred embodiments of the present invention, power is derived from power rails 16 mounted upon one or both support tracks 2. One or a plurality of power rails 16 may be provided, which are connected at a suitable location with a mains or other power supply. Electrical connectors 17 are then mounted on each pallet to receive power continuously for the pallet while it is mounted on the tracks.

FIG. 3 shows the power collection arrangement in a little more detail. The connectors, such as brushes or other electrical contacts, are mounted resiliently on mounts 18 and are preferably arranged so that if the pallet wobbles or displaces in the vertical direction, electrical contact is still maintained, over a certain degree of displacement, between the contacts and the power rails to maintain electrical connection.

The power rails may be mounted in channels 19 in a mounting block 19a secured to a support track 2, for receiving the flexible elongate contacts 17.

FIG. 2 also shows a pair of idler wheels 20 mounted on side portions of the pallet to act laterally against the inner side walls of the tracks and which serve to locate the pallet against transverse movement.

Control unit 15 may also include one or more connectors 21 for connection to a work station or work piece and a connector 22 which may be a slot into which may be inserted a tag such as an electronic token (eg the type known as a smart card) which will be associated with each product to be placed upon the pallet and to bear particular details of that product and the work to done upon it. This will be further described below.

Figure 4:
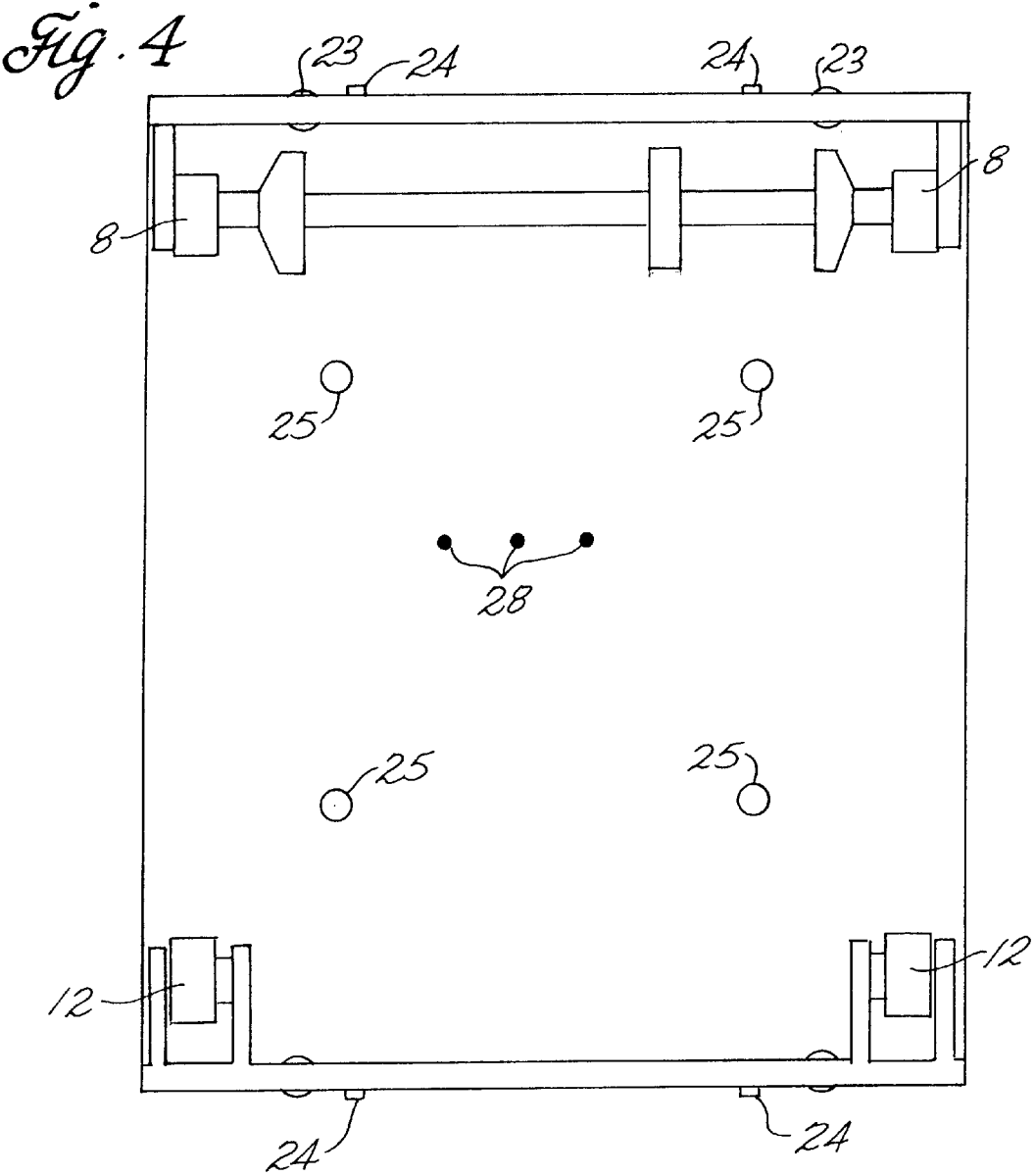
FIG. 4 shows a bottom view of the pallet.

FIG. 4 shows an underplan view of a pallet illustrating the front (driven) wheel assembly and the rear driven wheels or rollers. Idler wheels 23 may also be used on the front and/or rear of the pallet and which may assist in maintaining the pallet with regard to the rails when the pallet follows curved portions of the rails. Four ultrasonic detectors/emitters 24 are also shown, two each on the front and rear of the pallet. Detectors such as these may be used to detect the presence, in particular the proximity, of another pallet and connected to the control unit 15 such that if the proximity of another pallet is detected then movement of the pallet is ceased or slowed so that a collision does not occur. Other means of ultrasonic detection may of course be used.

Four location bushes 25 are shown on the figure. They are used to locate a lift unit, situated at a work station, which locates in the bushes and lifts the pallet clear of the track when the pallet has stopped adjacent a work station. The pallet may only need to be raised a few millimetres or so, to lift the wheels clear, yet maintain electrical connection with the power rails by virtue of the resilient connection of the power supply. When a work operation has finished on the product held by the pallet then the lift may be lowered so that the driving wheels contact the track again and the motor is then re-engaged to drive the pallet forward.

Figure 5:
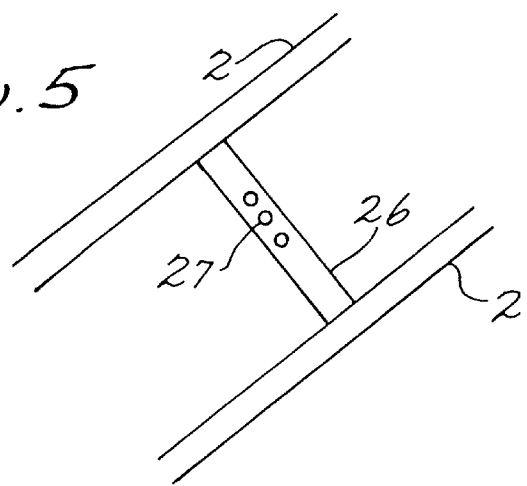
FIG. 5 shows a coding means.

It is desirable for the control system of the pallet to be able to receive and act upon instructions and data indicative of the position of the pallet and the desired motion and disposition of the pallet at any stage. This may be achieved in embodiments of the invention by a method of coding particular spatial locations of the conveyor and having sensors on the pallet which can read the particular code, the sensors providing data to the control unit to act upon the particular code according to predetermined rules. In the embodiment shown in FIGS. 4 and 5, coding is achieved by having at spaced intervals between the two support rails 2, cross bars 26 having a chosen number of locations 27 which are either filled in or have through holes. In the example shown, three of these are shown. On the underside of the pallet (FIG. 4) there are an equivalent number of detectors, which may be infrared sensors. There may be an infrared source mounted on the ground underneath the rails to shine through through holes where present or the underneath of the pallet may be provided with cooperating emitters and detectors, such as infrared emitters and detectors 28. Each one of these is adapted to detect whether or not a through hole is present at the equivalent position 27 and thus to generate a binary code, for example a one if a through hole is not present and a zero if one is present. Thus, the code is a binary code which, if there are three 'bits' to it as shown has eight different meanings depending upon which of the various sensors are activated. By providing more positions, eg four or five then correspondingly more (ie sixteen or thirty two) different codes can be generated. The control unit is provided with a list of actions corresponding to different codes. For example, a program may be for the pallet to move forward for ten seconds, stop for six seconds then move forward again. Other, more complicated codes may be used which involve combinations of forward and backward movement, difference speeds of movement, instructions to rotate the top of the pallet with respect to the rest of the pallet and other features. For example, a code may be to move forward for six seconds at a speed of three meters per minute, to stop for ten seconds, to move forward for ten seconds at a speed of two meters per minute, to stop for two seconds, to rotate the top of the pallet (and thereby the product to work upon) by 90°, to move backwards for six seconds at two meters per second and to stop for twenty seconds. This entire sequence may be the result of one particular binary code. Thus, considerable flexibility can be achieved in moving a product exactly in the right manner and at the right speed (for it may be useful to move at different speeds when passing different work stations for example) and to have different parts of the engine or other product being worked upon. By using coding associated with particular locations on the track, it is easy to adjust the coding if the track itself and thereby the path to be taken by product around a work place, differs. The coding may be changed merely by altering the coding on the cross pieces.

Other methods of coding will be apparent. For example, the detectors and emitters need not be infrared but may be other types. The coding may be done by physical contact or by contactless methods. The coding need not be on cross-bars but may be arranged on pillars adjacent to the tracks for example, or arranged in other positions.

Coded means associated with the spatial location and position of a pallet at any time are useful in determining its movement between work stations and in knowing where each pallet is for central planning and operation purposes. However, it is desirable that information representative of the actual product being carried by the pallet at any time be made available to the users of the system. As described above, the control unit includes connections 21 for connecting to a work station to transfer data therebetween and a means such as reader 22 into which a token bearing data representative of a product may be interrogated, read or written to. This may be an electronic token or tag such as a so-called smart card or smart tag which bears its own processor means and a memory and can store data electronically. A schematic tag is shown at 30 and includes an on-board ROM or RAM memory of 128 or 256 K Bytes in some embodiments. Other memory values may of course be used. The tag may alternatively be a memory chip, or a standard expansion card such as a PCMCIA card (Personal Computer Memory Card International Association), of the type normally used with personal computers. Other types of electronic tag may be used, or the tag may be of optical or other functioning, or even a punched card or, tape, floppy disc, CD or other data carrier. The tag operates in well known manner to interface with the processing unit. It may have a series of electrical contacts on it which electrically connect with associated contacts on the processor to transfer data. Alternatively, it may be of contactless type. It may alternatively have data stored magnetically which can be read (similar to a bank card for example) or may bear optical, holographic or any other type of data. The tag 30 may be programmed with data representative of a particular product, for example one particular engine type or one unique engine. When this engine is mounted upon the pallet its associated tag is inserted into slot 22 (or other reader or connection means) and thus the control unit 15 downloads or is appraised with the data representative of that product. This data may be, for example, details of the type of product, the work stations which it must pass through and the particular operations which must be done to it. This data may be in great detail such as the exact torque required to tighten each nut or the depth to which a cutting tool must go and may also bear more general information such as the identification number of the engine, its capacity, date of manufacture, destination, and so on. When the pallet moves the engine to a particular work station, that work station may be connected to the control unit by connections 21. This may be done manually but more preferably an automated connection method is used as will be described below. Once connection is made, then data relevant to the product and to that particular work station is transferred and the work station can be automatically programmed or arranged to perform the desired operation.

A feature of embodiments of the present invention is therefore that adjacent pallets in the work stream may hold different products and that, by virtue of the unique tag associated with each product, the correct operations are automatically done on each product. Thus, one product may be placed adjacent one work station and a particular operation done and the second product when placed adjacent that same work station may have a different operation done. This will be achieved automatically. Alternatively, a particular product may not need any work being done at particular station so that when it stops at that station a signal is passed saying that no work needs be done and the product is automatically transferred to the next work station. Instead of a manual connection by using connectors such as 21, the connection may be done automatically by having electrical connectors, eg electrical rails, mounted on the pallet and associated connectors mounted on a part of the track adjacent to a particular work station or on the work station itself or its vicinity. When the pallet arrives in the vicinity of the work station contact can automatically be made between these two. For example, lengths of electrically conductive rail may be provided on the pallet which are in direct electrical communication with control unit 15. Contact shoes or brushes may be provided on the rail, or on the coding bar used for the coding 27 or by other means adjacent to a work station. When the pallet lies over the coding bars or other means the contact shoes make contact with the electrical rails and therefore the pallet is in electrical communication with the work station.

The communication is preferably bidirectional so that not only is data representative of the particular product transferred to the work station, but also the work station can transfer data back to the control unit 15. This may be stored in the control unit and subsequently read out or, where the tag is one which can be written to, may be stored onto the tag itself. This data may indicate that a particular operation has been done on the engine or other product and can indicate exactly how this was done, the particular parameters and ambient condition and so on. Thus, after a product has traversed the entire work area, the control unit 15, or the tag 30 may contain data not only of the type of unit and work which had to be done on it, but also the work which was actually done on the unit and the conditions and parameters under the which the work was actually done. These can then be checked against each other to ensure that the work was done properly and that all necessary work has been done.

The data stored initially on the tag may also have details of the attitude (ie rotation) of the product when it is worked upon by any particular work station so that the product is automatically turned to that attitude before the product reaches that work station. It may also include details of particular operators authorised to work upon the product or not to work upon it so that the operator has to identify himself either by a code or by other means, to show he is authorised to worked upon that product. Many other uses will be apparent.

In a modification, the product itself may have electronic memory, processing means and input/output means associated with it and the pallet may have corresponding input/output means so that when the product is placed upon the pallet the two are in communication, thus avoiding the need for a separate tag.

Alternatively, data may be input directly into control unit 15 manually. This may in some circumstances be labour-intensive and prone to error, but in other circumstances this technique may be preferable. The control unit includes suitable input and/or output means to enable data to be entered into it, or extracted from it, such as card- or tag-readers, scanning means, a keyboard or input buttons or other means.

We claim:

1. A conveying apparatus comprising a pallet adapted for movement relative to at least one guide rail, the pallet comprising means for driving the pallet with respect to the guide rail, wherein the pallet is provided with data processing and/or storage means for receiving data associated with a product carried by the pallet, and/or for receiving control information to control the movement and/or functioning of the pallet, wherein means are provided on the pallet for drawing power from power supply means on the guide rail, wherein the power supply means on the guide rail are one or more power rails connected to a power supply.

2. A conveying apparatus to be guided along a guide rail having a power supply rail, the conveying apparatus comprising:

a mobile pallet for receiving an item to be conveyed and having engagement means which is operable for engaging the guide rail and, through such engagement causing the pallet to be guided along a path defined by the guide rail;

motor drive means mounted on board the pallet and operable for driving the pallet with respect to the guide rail;

power supply means mounted on board the pallet having electrical contact means for making sliding contact with said power supply rail to receive power therefrom and connected to the motor drive means for supplying drive power to the motor drive means; and data processing means mounted on board the pallet and connected to the motor drive means for controlling the motor drive means in response to control data available to the data processing means.

3. Conveying apparatus according to claim 2, wherein said engagement means comprises idler wheel means mounted for rotation with respect to the pallet and operable for engaging a lateral surface defined by the guide rail.

4. Conveying apparatus according to claim 2, wherein said electrical contact means are mounted for resilient movement with respect to the pallet for maintaining said sliding contact in the face of limited up and down displacement of the pallet relative to the guide rail.

5. Conveying apparatus according to claim 2, wherein the pallet comprises one or more driven wheels and said motor drive means comprises an electrical motor coupled to said one or more driven wheels through clutch means.

6. Conveying apparatus as claimed in claim 2, wherein the pallet has a top portion which is rotatable with respect to the remainder of the pallet.

7. Conveying apparatus according to claim 2, including second data processing means operable for reading from and/or writing data to an electronic data storage tag, the tag being uniquely identified with a particular product to be mounted on the pallet and wherein means are provided for connecting the pallet with a work station to transfer data associated with the tag to the work station.

8. Conveying apparatus as claimed in claim 2, including means for inputting data directly into the data processing means.

9. Conveying apparatus as claimed in claim 2, wherein the pallet and a work station are provided with cooperating electrically contacting means which make contact when the pallet is in a desired position in the vicinity of the work station to transfer data between them.

10. Conveying apparatus as claimed in claim 2, comprising coding means associated with one or more locations of the guide rail and wherein the data processing means comprises means for detecting the coding means and for operating the pallet according to procedures provided by the coding means.

11. Conveying apparatus as claimed in claim 10, wherein the coding means comprises a binary code located at one or more predetermined positions with regard to the guide rail and wherein the data processing means for detecting the binary coding on the pallet.

12. Conveying apparatus as claimed in claim 10, wherein the coding means contains information of the sequence of movement, speed and/or attitude of the pallet.

13. Conveying apparatus as claimed in claim 10, wherein the data processing means can determine the sequence of movement, speed and/or attitude of the pallet after the data processing means detects the coding.

14. Conveying apparatus as claimed in claim 12, wherein the coding means comprises a plurality of coded messages are provided at spaced intervals along the guide rail.

15. A conveying apparatus comprising a pallet adapted for movement relative to at least one guide rail, the pallet comprising means for driving the pallet with respect to the guide rail, wherein the pallet is provided with data processing and/or storage means for receiving data associated with a product carried by the pallet, and/or for receiving control information to control the movement and/or functioning of the pallet, wherein means are provided on the pallet for drawing power from power supply means on the guide rail, said power drawing means being mounted such that contact is maintained with the power supply means when the pallet is raised or lowered by a limited degree with respect to the guide rail.

16. A conveying apparatus to be guided along a guide rail having a power supply rail, the conveying apparatus comprising:
   a mobile pallet for receiving an item to be conveyed and having engagement means which is operable for engaging the guide rail and, through such engagement causing the pallet to be guided along a path defined by the guide rail;
   a motor drive mounted on board the pallet and operable to drive the pallet with respect to the guide rail;
   a power supply mounted on board the pallet having electrical contacts to make sliding contact with said power supply rail to receive power therefrom and connected to the motor drive for supplying drive power to the motor drive; and
   a data processor mounted on board the pallet and connected to the motor drive to control the motor drive in response to control data available to the data processor.

17. A conveying apparatus according to claim 16, wherein said engagement means comprises idler wheels mounted on the pallet and rotatable with respect to the pallet and operable for engaging a lateral surface defined by the guide rail.

18. A conveying apparatus according to claim 16, wherein said electrical contacts are mounted for resilient movement with respect to the pallet to maintain said sliding contact in the face of limited up and down displacement of the pallet relative to the guide rail.

19. A conveying apparatus as claimed in claim 16, comprising a coding associated with one or more locations of the guide rail and wherein the data processor detects the coding and operates the pallet according to procedures provided by the coding.

20. A conveying apparatus as claimed in claim 19, wherein the coding contains information of the sequence of movement, speed and/or attitude of the pallet.

* * * * *